UNITED STATES PATENT OFFICE.

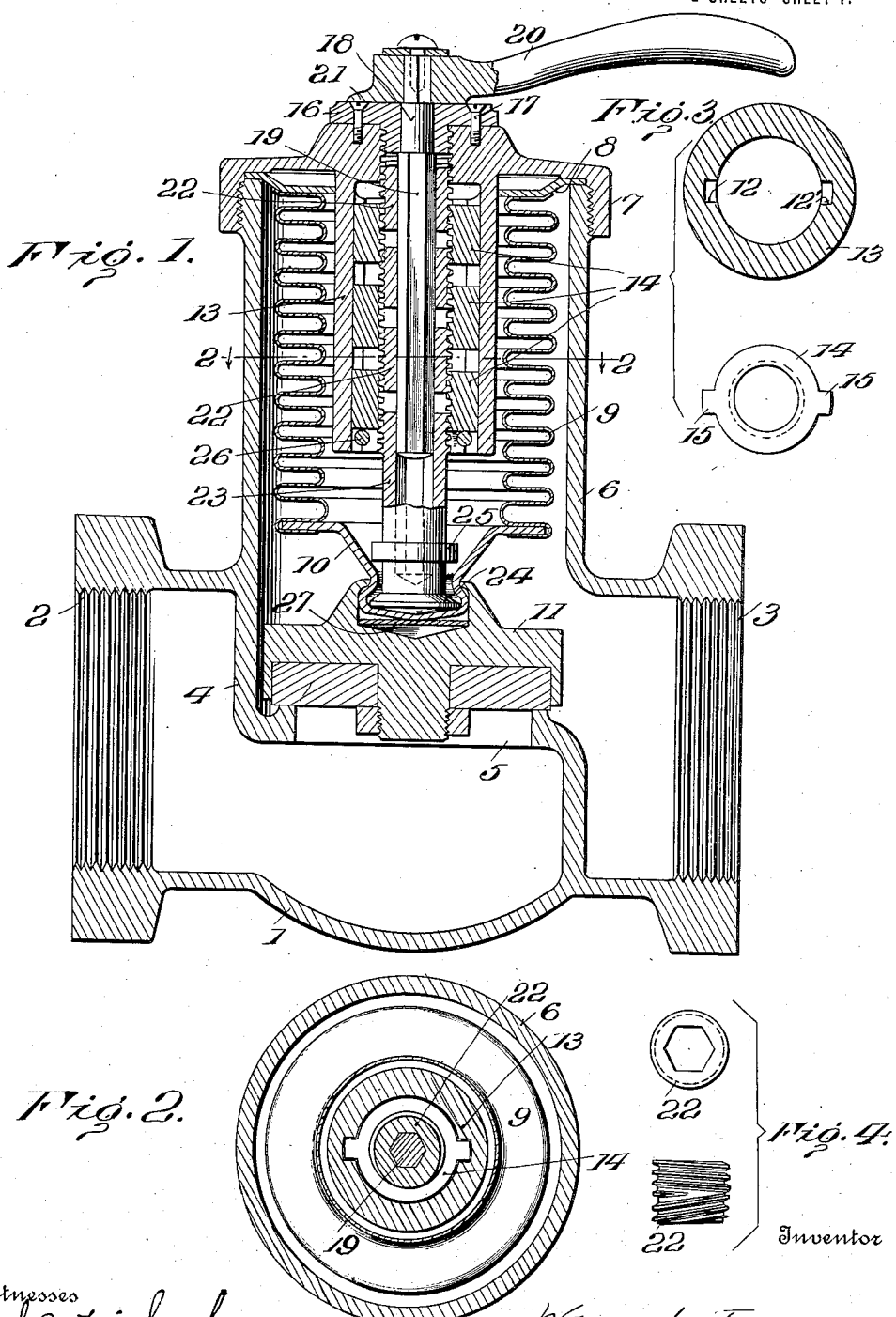

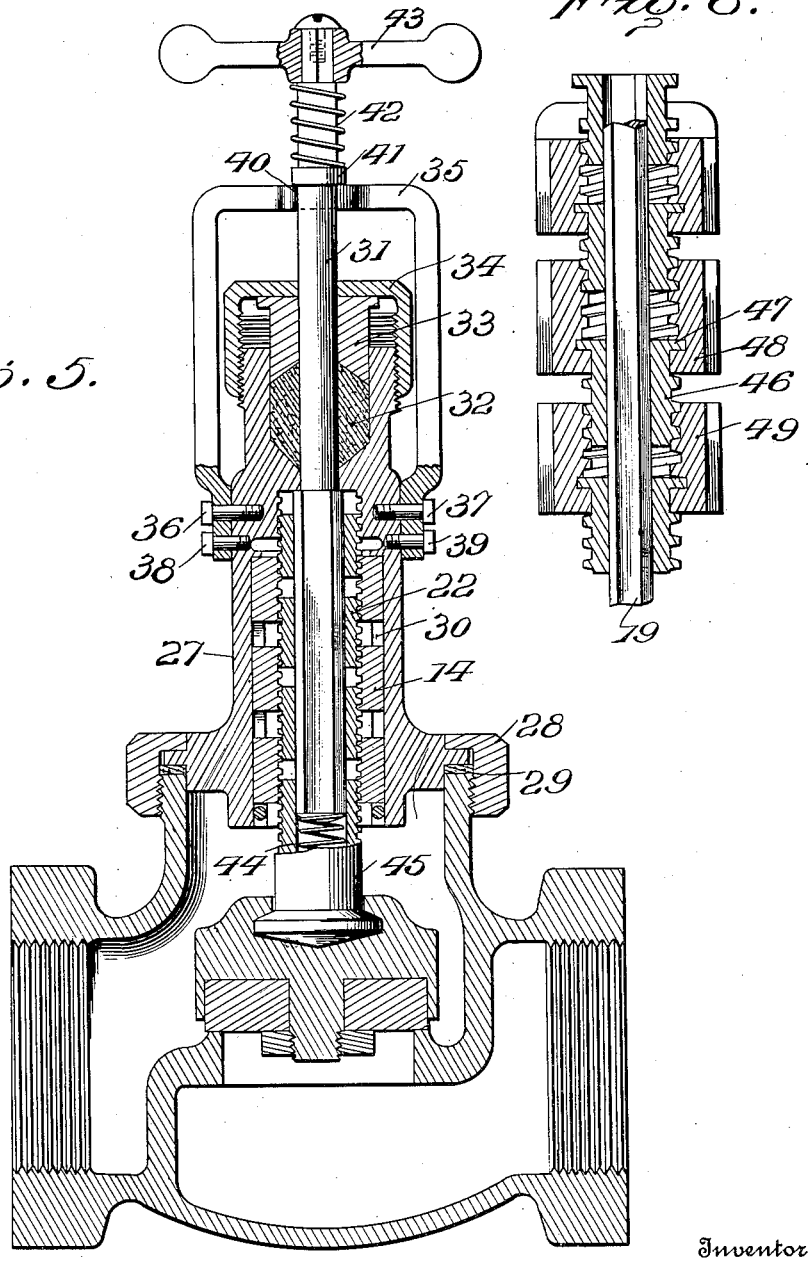

WESTON M. FULTON, OF KNOXVILLE, TENNESSEE, ASSIGNOR TO THE FULTON COMPANY, OF KNOXVILLE, TENNESSEE, A CORPORATION OF MAINE.

QUICK-ACTION VALVE.

1,175,253.  Specification of Letters Patent.  Patented Mar. 14, 1916.

Application filed June 29, 1914. Serial No. 848,042.

*To all whom it may concern:*

Be it known that I, WESTON M. FULTON, a citizen of the United States of America, and resident of Knoxville, Tennessee, have invented a new and useful Improvement in Quick-Action Valves, which invention is fully set forth in the following specification.

This invention relates to quick action valves, and more particularly to valves of this class in which a limited rotary movement of the valve stem causes a multiplied rectilinear movement of the valve member.

Heretofore valves have been given a quick action by providing the valve stem with threads of very high pitch, but valves of this type present the disadvantage of opening unexpectedly and particularly when they are located in pipe lines subject to jars and vibrations. The valve stem has also been provided with right and left-hand threads whereby the valve moves on the valve stem while the latter raises and lowers by turning the stem. The increase in movement in valves of this kind is limited to twice the longitudinal movement of the stem and is not as rapid as often desired even when the threads are of steep pitch, the use of which introduces other difficulties as above noted.

My invention overcomes the above objections and consists, generally stated, in providing a valve with a plurality of rotatable sections arranged in series or alinement, each of which sections is rotatably connected to a slidable non-rotating nut. This rotatable connection of the section to the nut may be effected in a variety of ways. For example, each section may be provided with a suitable collar turning in an annular interior groove within the nut, but preferably this connection is secured by providing a thread on the nut engaging the corresponding thread on the section. These sections with the nuts thus connected to them are arranged in alinement and each of the nuts on one section engages screw-threads on the next adjacent section. The threaded connection of the section with the non-rotating nut presents the advantage of giving greater rectilinear movement of the part to be moved as compared with the collar connection for a given rotation of the sections.

The inventive idea may be embodied in a variety of mechanical forms, some of which are shown by way of example in the accompanying drawings which are intended to assist the description but are not intended to define the limits thereof.

Figure 1 is a view in longitudinal central section of a valve provided with my improvements; Fig. 2 is a cross sectional view taken on line 2—2 of Fig. 1; Figs. 3 and 4 are detail views of parts of the multiplying device; Fig. 5 is a view in longitudinal central section showing my improvements in connection with a globe valve with packed valve stem; and Fig. 6 is a view in central section showing a modified form of the multiplying device.

Referring to Fig. 1 of the drawings, 1 is a valve casing having the usual threaded inlet 2 and outlet 3 and a partition 4 having a valve-controlled opening 5. Extending from one side of the casing 1 is a housing 6 open to the valve casing at one end and closed at the opposite end by a screw cap 7. Secured between the under side of the cap 7 and the end of the housing wall is a flange 8 soldered or brazed to the end of a corrugated collapsible and expansible tubular wall 9. The lower end of this tubular wall is closed by a head 10 which is depressed into funnel form and terminates in a button-shaped enlargement on which is supported a valve ring carrier 11. Within the tubular wall 9 and supported from cap 7 are guideways 12, 12', Fig. 3, preferably formed in a depending tubular projection 13 which may be cast integral with the cap and machined out to provide ways for guiding non-rotating nuts 14 which have lugs 15 for sliding in the ways 12, 12'. Each of the nuts 14 is interiorly threaded with low-pitch threads for connection with rotatable sections 22, the threads in one-half of each nut being right-hand and the threads in the other half being left-hand. For convenience, the upper half of each nut 14 is provided with a left-hand thread and the lower half with a right-hand thread. The cap 7 is provided with a central threaded opening for receiving a combination plug and bearing nut 16 which is adapted to be secured to the cap by screws 17. The nut 16 has an opening with smooth bore for receiving the reduced end 18 of a key rod 19 terminating in a squared end which receives a handle member 20 secured to the key rod by a screw-washer in the usual manner. An index member 21 formed of a projection from the handle travels over a graduated arc, not shown, on the nut 7 for indicating the amount of opening of the valve. The main portion of key stem 19 is preferably formed hexagonal to receive sections 22 which are interiorly provided with corresponding openings and are provided exteriorly with screw-threads which are right-hand on the upper half of each section and left-hand on the lower half of each section. In Fig. 4 are shown a plan view and a side view of one of these sections 22. The terminal and lowest section of this series is lengthened into a hollow stem 23 which ends in a head 24 around which the head 10 folds and is also preferably provided with a collar 25 for coöperating in securing the stem to the end wall. To prevent the sections 14 from leaving their guides, pins 26 are inserted in the end of the guide tube 13. These pins also act to confine the wall within its elastic limits in one direction, while the nut 16 serves a like purpose in the opposite direction. A spring disk 27 is preferably interposed between the valve ring carrier 11 and the valve-operating means to cushion the seating of the valve.

Assuming the parts of the device to have been assembled and the valve in seated position, the operation is as follows:—To open the valve, the handle 20 is given a counter-clockwise turn through part of a turn or, for convenience of explanation, through a whole turn. The hexagonal stem 19 connected to handle 20 causes sections 22 to make one complete turn. The top section 22 is thereby lifted the distance of one thread and has caused the non-revoluble nut 14 to climb one thread on top section 22 by reason of its left-hand thread engagement therewith. One revolution of top section 22 in the first non-revoluble nut 14 therefore lifts the latter two threads. With three of such nuts, the bottom nut 14 will have climbed a distance of six threads for one turn of the handle 20. The last rotatable section which is extended into a stem 23 rises one thread in the lowest non-rotatable nut and therefore the valve 11 is lifted seven threads for one turn of the handle 20. From the above, it will be evident that the rotation of the valve handle or wheel effects a multiplied or increased movement of the valve to any desired extent, without the use of threads of high pitch or use of cumbersome levers, and that the principle can be applied to valves of any size, style or type.

While I have above shown the valve-operating device in connection with the non-packed type of valve, I may use it in connection with a packed valve stem, as shown in Fig. 5, wherein is illustrated a globe valve of the usual type, to the casing of which is secured a housing or bonnet 27 in any desired manner, such as by means of a union nut 28 and a packing ring 29 for making a fluid-tight joint with the valve casing. Slide-ways 30 are cut on the interior walls of this bonnet for receiving the lugs of non-rotatable nuts 14 which are identical in form with those above described in connection with Fig. 1 and coöperate with sections 22 rotated by a hexagonal key stem 19 on which they slide. The key stem in this type of valve has a long reduced cylindrical portion 31 which passes through packing 32 contained in an end recess of the bonnet and held there by a suitable follower 33 and screw cap 34. In order to hold the stem 31 yieldingly in place while permitting freedom of rotation, a yoke 35 is provided which has the ends of its arms pivoted on screws 36, 37 entering the sides of the bonnet and is made fast in position by fillister headed screws 38, 39. A slot 40 is formed in the cross member of the yoke and receives the round stem 31 of the key member. A loose collar 41 is slipped over the end of stem 31 and rests on the yoke and forms a bearing seat for a spring 42 which presses upward against the under side of the stem handle 43 to lift the stem and hold its hexagonal shoulder up against the wall of the bonnet. A spring 44 may also be provided between the end of stem 19 and the valve stem 45 for keeping the stem 19 in place.

The valve-operating device operates in the same manner as the one just described and therefore its description will not be repeated.

To renew the packing, fillister headed screws 38, 39 are removed and the yoke 35 is turned down, thereby giving access to the cap 34 and parts of the packing box. After packing, the yoke is returned to its original position and fastened by returning the screws 38 and 39.

While I prefer to connect the nuts and sections as above described, I may connect them by means of a collar and make the threads either all right-hand or all left-hand. In Fig. 6, I have shown a series of key-operated sections all having the same kind of threads. Each rotatable section 46 is provided with a collar 47 which fits in an annular recess formed in any suitable manner in the wall of each non-rotatable section, as indicated diagrammatically in the drawings. With this arrangement of sections, the rotation of the key stem 19 through one turn causes the upper non-rotatable nut to climb one thread on its rotatable section, the second non-rotatable nut two threads and so on. The valve, which may be assumed to be attached to the lowest rotatable section, will rise for one turn of the stem as many threads as there are non-revoluble sections. The movement of the valve wheel gives less movement of the valve for a given extent of rotation than in the form first described, but still retains the advantage of multiplying or increasing the movement imparted to the valve handle or wheel.

What is claimed is:—

1. In a quick action valve, the combination of a valve member and means for operating the same comprising a plurality of longitudinally slidable non-rotatable nuts each having right-hand threads at one end and left-hand threads at the other, a plurality of sections provided with corresponding right and left-hand threads engaging said nuts, and means for rotating said sections.

2. In a quick action valve, the combination of a valve member and means for operating the same comprising a plurality of sections arranged in alinement with the adjacent end portions of said sections provided the one with a right and the other with a left-hand screw-thread, slidable non-rotatable nuts provided with right and left-hand threads at their respective ends for connecting said sections, and means for rotating said sections.

3. In a quick action valve, the combination of a valve member and means for operating the same comprising two rotatable sections arranged in alinement with their adjacent ends provided the one with a right and the other with a left-hand screw-thread, a non-rotatable slidable nut, having screw-threads engaging the screw-threads on the adjacent ends of said sections, and means for rotating said sections.

4. In a quick action valve, the combination of a valve member and means for operating the same, comprising rotatable threaded sections one of which has a connection with said valve member, a non-rotatable slidable nut connecting said sections and having a screw thread engaging one of said sections, and means for rotating said sections.

5. In a quick action valve, the combination of a valve member and means for operating the same comprising a plurality of threaded sections and means for simultaneously rotating the same, and a slidable non-revoluble nut connecting adjacent sections whereby rotation of said sections causes a longitudinal cumulative movement between the nuts and sections.

6. In a quick action valve, the combination of a valve member and means for operating the same comprising a plurality of key-operated rotatable threaded sections, and a slidable non-rotatable nut connecting adjacent sections, whereby rotation of said sections causes longitudinal cumulative movement between the nuts and sections.

7. In combination with a valve member, a plurality of slidable non-revoluble nuts each having right and left hand threads, a plurality of key operated sections having threads engaging the respective right and left hand threads of said nuts, said valve member being connected to one of said sections.

8. In a quick action valve, the combination of a flexible wall, a valve member connected to said wall, means for flexing said wall between predetermined limits to effect movement of said valve comprising rotatable threaded sections arranged in alinement, non-rotatable slidable nuts each secured to one of said sections and provided with threads engaging the screw-threads on the next adjacent section, stop means limiting the movement of said nuts, and means for rotating said sections.

9. In a quick action valve, the combination of a flexible wall, a valve member connected thereto and means for flexing said wall between predetermined limits to effect movement of said valve comprising rotatable threaded sections arranged in alinement, non-rotatable slidable nuts each secured to one of said sections and provided with threads engaging the threads on the next adjacent section, guides in which said nuts slide provided with means limiting the movement of said nuts, and means for rotating said sections.

10. In a quick action valve, the combination of a valve member and means for operating the same, comprising rotatable threaded sections one of which has a connection with said valve member, a non-rotatable slidable nut connecting said sections and having a screw thread engaging one of said sections, a corrugated flexible wall surrounding said operating means and having an end closure adapted to follow the movement of said valve member, and means for rotating said sections.

In testimony whereof I have signed this specification in the presence of two subscribing witnesses.

WESTON M. FULTON.

Witnesses:
H. T. PATTON,
H. S. McCOY.